United States Patent
Zhang et al.

(10) Patent No.: US 12,337,242 B2
(45) Date of Patent: Jun. 24, 2025

(54) SCREEN DISPLAY METHOD AND APPARATUS, DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventors: Ya Zhang, Guangdong (CN); Lin Lin, Guangdong (CN); Haohui Liang, Guangdong (CN); Shanshan Qian, Guangdong (CN); Yinchao Chen, Guangdong (CN); Han Wen, Guangdong (CN); Yiqi Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 347 days.

(21) Appl. No.: 17/976,389

(22) Filed: Oct. 28, 2022

(65) Prior Publication Data

US 2023/0049033 A1     Feb. 16, 2023

Related U.S. Application Data

(63) Continuation of application No. PCT/CN2022/082412, filed on Mar. 23, 2022.

(30) Foreign Application Priority Data

Apr. 23, 2021  (CN) .......................... 202110442152.7

(51) Int. Cl.
  *A63F 13/79*   (2014.01)
(52) U.S. Cl.
  CPC ........ *A63F 13/79* (2014.09); *A63F 2300/308* (2013.01); *A63F 2300/5546* (2013.01)

(58) Field of Classification Search
  None
  See application file for complete search history.

(56) References Cited

U.S. PATENT DOCUMENTS 6,304,272 B1 * 10/2001 Schanel .............. G06F 3/04845
                                                    345/676
2008/0126939 A1 * 5/2008 Chung ..................... H04N 5/76
                                                    386/E5.001

(Continued)

FOREIGN PATENT DOCUMENTS

| CN | 102779042 A | 11/2012 |
| CN | 102917117 A | 2/2013 |

(Continued)

OTHER PUBLICATIONS

Sunny, Mar. 23, 2020, https://jingyan. baiclu. com/article/1 lcl7a2c566c43b546e 39da7. html.

(Continued)

*Primary Examiner* — Jason T Yen
(74) *Attorney, Agent, or Firm* — Sughrue Mion, PLLC

(57) ABSTRACT

A screen display method and apparatus, a device, a storage medium, and a program product, in the field of application development technologies are provided. The method includes: displaying a display interface of an application running on a terminal device, the display interface displaying a first application screen of a first user account in the application; displaying an account display bar, the account display bar displaying identifiers of a plurality of user accounts participating in a service related to the application; displaying, in response to an operation on an identifier of a target user account among the identifiers of the plurality of user accounts, the identifier of the target user account in the display interface; and displaying a target screen of the target user account in response to the operation on the identifier of (Continued)

the target user account, the target screen being a screen of the target user account in the application.

20 Claims, 6 Drawing Sheets

(56) References Cited

U.S. PATENT DOCUMENTS

| | | | | |
|---|---|---|---|---|
| 2009/0118006 | A1* | 5/2009 | Kelly | A63F 3/00643 463/31 |
| 2010/0050088 | A1* | 2/2010 | Neustaedter | G06F 3/0482 715/745 |
| 2014/0040777 | A1* | 2/2014 | Jones | H04L 65/403 715/753 |
| 2015/0224409 | A1* | 8/2015 | Hayashida | A63F 13/497 463/31 |
| 2015/0293616 | A1 | 10/2015 | Cheng | |
| 2016/0199739 | A1* | 7/2016 | Honda | A63F 13/798 463/42 |
| 2017/0065885 | A1* | 3/2017 | Kunieda | A63F 13/32 |
| 2020/0143197 | A1* | 5/2020 | Zmijewski | A63F 13/87 |
| 2020/0279458 | A1* | 9/2020 | France | G07F 17/3293 |
| 2020/0306650 | A1* | 10/2020 | Fujihara | H04L 67/1046 |
| 2021/0209559 | A1* | 7/2021 | Prasad | G06Q 10/105 |

FOREIGN PATENT DOCUMENTS

| | | |
|---|---|---|
| CN | 103150081 A | 6/2013 |
| CN | 111870956 A | 11/2020 |
| CN | 113144596 A | 7/2021 |

OTHER PUBLICATIONS

Chinese Office Action for 202110442152.7 dated Oct. 25, 2022.
International Search Report for PCT/CN2022/082412 dated, Jun. 22, 2022 (PCT/ISA/210).
Written Opinion of the International Searching Authority for PCT/CN2022/082412 dated, Jun. 22, 2022 (PCT/ISA/237).

* cited by examiner

SCREEN DISPLAY METHOD AND APPARATUS, DEVICE, STORAGE MEDIUM, AND PROGRAM PRODUCT

CROSS-REFERENCE TO RELATED APPLICATION(S)

This application is a continuation application of International Application No. PCT/CN2022/082412, filed on Mar. 23, 2022, which claims priority to Chinese Patent Application No. 202110442152.7, filed on Apr. 23, 2021, the disclosures of which are herein incorporated by reference in their entireties.

FIELD

Embodiments of the disclosure relate to the field of application development technologies, and in particular, to a screen display method and apparatus, a device, a storage medium, and a program product.

BACKGROUND

With the development of application development technology, various competitive board games appear in the market.

In the related art, for an application such as, for example, a chess game match, an initial interface including a chessboard screen corresponding to an account of a user is displayed in a client, and an account display control is displayed in the initial interface; by clicking the account display control, the initial interface is switched to display an account display interface, and the account display interface displays identifiers of a plurality of user accounts participating in the chess game match; and to view a chessboard screen of a specific user account among the plurality of user accounts, the user needs to find an identifier of the specific user account from a plurality of identifiers, select the identifier of the specific user account, and click a chess game viewing control to confirm, so that the account display interface is switched to display the chessboard screen of the specific user account.

In the related art, to view an application screen (e.g., chessboard screen) of the specific user account, the user needs to search for the specific user account among the plurality of user accounts, and further needs to perform a plurality of operations and go through a plurality of interface switching to display the application screen of the specific user account, which consumes a relatively long time and has relatively low viewing efficiency.

SUMMARY

Embodiments of the disclosure provide a screen display method and apparatus, a terminal device, and a storage medium, which saves a time-consuming process for viewing a screen of a specific user account by a user in an application, and improves the viewing efficiency of the screen of the specific user account in the application. The technical solutions are as follows:

According to an aspect of an example embodiment of the disclosure, a screen display method is provided, performed by a terminal device, and the method including:

displaying a display interface of an application running on the terminal device, the display interface displaying a first application screen of a first user account in the application;

displaying an account display bar, the account display bar displaying identifiers of a plurality of user accounts participating in a service related to the application;

displaying, in response to an operation on an identifier of a target user account among the identifiers of the plurality of user accounts, the identifier of the target user account in the display interface; and displaying a target screen of the target user account in response to the operation on the identifier of the target user account, the target screen being a screen of the target user account in the application.

According to an aspect of an example embodiment of the disclosure, a screen display apparatus is provided, the apparatus including:

at least one memory configured to store program code; and at least one processor configured to read the program code and operate as instructed by the program code, the program code including:

screen display code configured to cause the at least one processor to display a display interface of an application, the display interface displaying a first screen of a first user account, and the first screen being a screen of the first user account in the application;

identifier display code configured to cause the at least one processor to display an account display bar, the account display bar displaying the identifiers of a plurality of user accounts, and the plurality of user accounts being user accounts participating in a service related to the application;

the identifier display code being further configured to cause the at least one processor to display, in response to an operation on an identifier of a target user account among the identifiers of the plurality of user accounts, the identifier of the target user account in the display interface; and the screen display code being further configured to cause the at least one processor to display a target screen of the target user account in response to the operation on the identifier of the target user account, the target screen being a screen of the target user account in the application.

According to an aspect of an example embodiment of the disclosure, a terminal device is provided, including a processor and a memory, the memory storing at least one instruction, at least one program, a code set, or an instruction set, the at least one instruction, the at least one program, the code set, or the instruction set being loaded and executed by the processor to implement the screen display method.

According to an aspect of this embodiment of the disclosure, a computer-readable storage medium is provided, storing at least one instruction, at least one program, a code set, or an instruction set, the at least one instruction, the at least one program, the code set, or the instruction set being loaded and executed by a processor to implement the screen display method.

According to an aspect of an example embodiment of the disclosure, a computer program product is provided, including computer instructions, the computer instructions being stored in a computer-readable storage medium. A processor of a terminal device reads the computer instructions from the computer-readable storage medium, and executes the computer instructions, to cause the terminal device to perform screen display method.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other accompanying drawings from these accompanying drawings without creative efforts.

DETAILED DESCRIPTION

Figure 1:
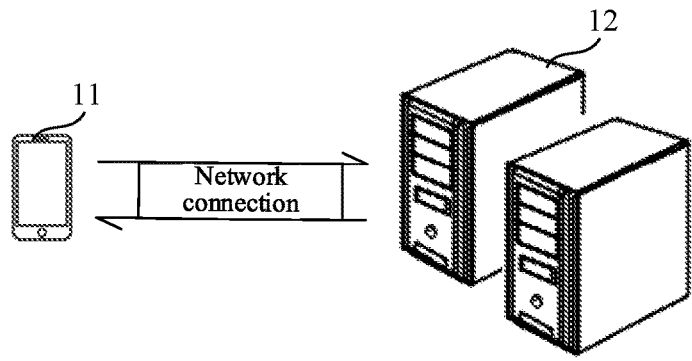
FIG. 1 is a schematic diagram of an implementation environment according to an embodiment of the disclosure.

Example embodiments are described in detail herein, with reference to the accompanying drawings. When the following description involves the accompanying drawings, unless otherwise indicated, the same numerals in different accompanying drawings represent the same or similar elements. The implementations described in the following example embodiments do not represent all implementations that are consistent with the disclosure. On the contrary, the implementations are merely examples of methods that are described in detail in the appended claims and that are consistent with some aspects of the disclosure.

First, terms described in the embodiments of the disclosure are briefly introduced.

Chess game match refers to a game competition in which a plurality of user accounts participate by arranging a chess game. The quantity of user accounts that participate in a chess game match may be 4, 6, 8, 20, 40, 80, 100, or the like. The quantity of user accounts that participate in a chess game match may be 100 or around 100 (such as 90, 92, 95, 102, 105, or the like). The chess game match may also be referred to as a "hundred-person game". In an embodiment, the quantity of user accounts that participate in a chess game match may be specifically set by the related technical personnel according to actual conditions, which is not specifically limited in this embodiment of the disclosure. Hereinafter, a chess game match is used as an example of an application running on a terminal device and a screen display method according to an example embodiment is described by using an example in which the method is applied to a chess game match for illustrative purposes only. It should be noted that the screen display method according to an example embodiment is not limited to the chess game match but may be applied to any other type of an application in which a plurality of user accounts participate.

In some embodiments, each user account corresponds to one user. Through a free choice between users or random matching by a system, a plurality of user accounts are allocated to respective chess game to perform battles. The quantity of user accounts in each chess game is the same or similar. In an embodiment, the quantity of user accounts in each game may be 2, 3, 4, 5, 6, 7, 8, or the like. The quantity of user accounts in each chess game may be set by the related technical personnel, which is not specifically limited in this embodiment of the disclosure.

Chessboard screen: A chessboard screen is used for displaying a chess game arranged by the user account. In an embodiment, the chessboard screen displays a chessboard with a user account, and the chessboard is divided into a battle region and a battle preparation region. The battle region includes several battle lattices of the same size, and the battle lattices are used for placing battle pieces that perform battles during the battle; and the battle preparation region includes several battle preparation lattices, and the battle preparation lattices are used for placing a battle preparation piece. The battle preparation piece does not participate in the battle during the battle, but may be dragged and placed in the battle region during a preparation stage.

In some embodiments, battle pieces and battle preparation pieces are collectively referred to as virtual pieces. An image of the virtual piece may be a virtual character, a virtual animal, a cartoon character, or the like, and the virtual piece may be displayed by using a three-dimensional model. In an embodiment, a position of the virtual piece on a chessboard may be changed. During the preparation stage, the user may adjust a position of the battle piece in the battle region, adjust a position of the battle preparation piece in the battle preparation region, move the battle piece to the battle preparation region (e.g., when there are free battle preparation lattices in the battle preparation region), or move the battle preparation piece to the battle region. During the battle stage, the position of the battle preparation piece in the battle preparation region may still be adjusted. In addition, in the preparation stage of the chess game, the chess piece may only be set in the battle region of the current party, and the battle piece set by the enemy is not visible on the chessboard.

Next, an introduction is made on a competition manner of the chess game match by using an example in which the quantity of user accounts participating in each game is two in a chess game match: at the beginning of the chess game match, a plurality of user accounts battle with each other in a manner of random matching; after a round ends, if the user account meets an elimination condition, the user account is eliminated in the chess game match, so that the user account cannot continue to battle with other user accounts in the chess game match; and the user account that is not eliminated continues to battle with each other in a manner of random matching, and the remaining user accounts are eliminated according to the elimination condition until the chess game match ends. In a chess game match, the user may not only view chessboard screens related to the user's user account, but may further view chessboard screens of other user accounts in a chess game match that the user does not participate in, so as to understand how the other users arrange pieces.

FIG. 1 is a schematic diagram of an implementation environment according to an embodiment of the disclosure. The implementation environment may be implemented as a display system 10 of a chessboard screen. As shown in FIG. 1, the display system 10 may include a terminal device 11.

A target application may be installed and run in the terminal device 11, such as a client of the target application, and a first user account may be logged in to the client. The terminal device 11 is an electronic device with data computing, processing, and storage capabilities. The terminal device 11 may be a smart phone, a tablet computer, a personal computer (PC), a wearable device, or the like, which is not limited in this embodiment of the disclosure. In an embodiment, the terminal device 11 is a mobile terminal device with a touch display screen, and the user may implement man-machine interaction through the touch display screen. The target application may be a game application, such as a chess and card game application, a multi-player online battle arena (MOBA) game application, a shooting game application, a multiplayer shooting survival game application, a battle royale game application, a location based service (LBS) game application, or the like. This is not limited in the embodiments of the disclosure. The chess and card game application may be a self-propelled chess game application. The target application may further be any application with a chessboard screen display function, such as a social application, a payment application, a video application, a music application, a shopping application, and a news application. In the method provided in the embodiments of the disclosure, an execution entity of each operation may be 11 terminal device 11, for example, a client running in the terminal device 11.

In some embodiments, the system 10 further includes a server 12. The server 12 establishes a communication connection (for example, a network connection) with the terminal device 11, and the server 12 is configured to provide backend services for the target application. The server 12 may be an independent physical server, or may be a server cluster including a plurality of physical servers or a distributed system, or may be a cloud server providing a cloud computing service.

The chessboard screen display method provided in this embodiment of the disclosure may be applied to a scene displayed by a display screen, and may also be applied to display scenes such as augmented reality (AR) and virtual reality (VR). This is not limited in the embodiments of the disclosure.

Next, the technical solutions of example embodiments of the disclosure are described.

Figure 2:
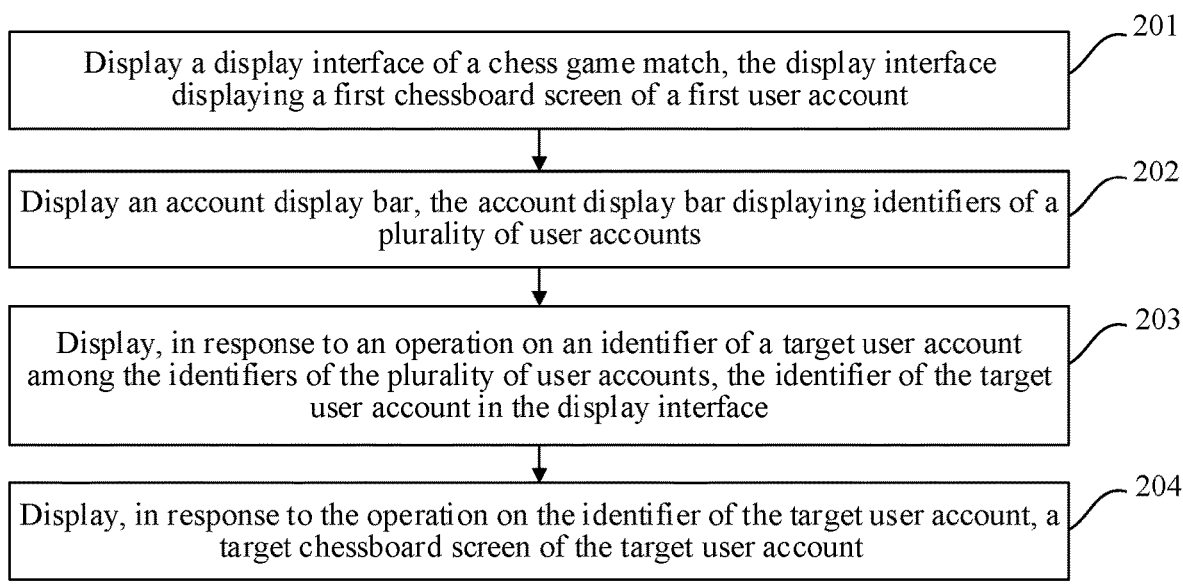
FIG. 2 is a flowchart of a screen display method according to an embodiment of the disclosure.

FIG. 2 is a flowchart of a screen display method according to an embodiment of the disclosure. In this embodiment, descriptions are made by using an example in which the method is applied to the client described above. The method may include the following operations, 201 to 204:

Operation 201. Display a display interface of a chess game match, the display interface displaying a first chessboard screen of a first user account.

In an embodiment, the first user account is a user account logged in in the client. In some embodiments, the display interface (also referred to as the interface) refers to a region displayed on the terminal device when the client is running. The chessboard screen of the user account in the chess game match may be displayed in the display interface, such as displaying a first chessboard screen in the display interface. In some embodiments, the first chessboard screen is a chessboard screen of the first user account in the chess game match. The chess game match refers to a game competition in which a plurality of user accounts participate in the game competition by arranging a chess game. The chess game refers to a battle form of chess pieces of each party on the chessboard when playing chess. In some embodiments, the chessboard screen displays a chessboard corresponding to the user account and a position of a piece on the chessboard. In an embodiment, the chessboard screen further displays battle information of the corresponding chess game, such as the eliminated chess pieces of both battle parties and the quantity of chess pieces, and the amount of virtual resources of both battle parties (such as virtual currency, health point, or the like).

Operation 202. Display an account display bar, the account display bar displaying the identifiers of a plurality of user accounts.

In some embodiments, a plurality of user accounts are user accounts participating in the chess game match. In some other embodiments, the plurality of user accounts refer to user accounts that still exist in the chess game match and are eligible to continue participating in the chess game match, that is, user accounts that still survive the chess game match and have not been eliminated.

In some embodiments, the display interface further displays an account display control. The account display bar is displayed in response to a trigger operation for the account display control.

Reference may be made to part of the content of the operation 202, and operation 502 and operation 503 in the example embodiment in FIG. 5 that will be described below, which is not described herein.

Operation 203. Display, in response to an operation on an identifier of a target user account among the identifiers of the plurality of user accounts displayed on the account display bar, the identifier of the target user account in the display interface.

In some embodiments, the display interface includes a shortcut display region, and the identifier of the target user account may be displayed in the shortcut display region. In an embodiment, the shortcut display region is located on an upper layer of a chessboard screen in the chess game match.

In some embodiments, after recognizing the operation for the identifier of the target user account, the client adds the identifier of the target user account in the shortcut display region. In some embodiments, a shortcut display region and a first chessboard screen are simultaneously displayed in the client. In an embodiment, the shortcut display region is a part of a region of the first chessboard screen; and the chessboard screen is changed, and the shortcut display region may continue to be displayed in other chessboard screens. In an embodiment, the shortcut display region is located on the upper layer of the chessboard screen (such as the first chessboard screen); and when the chessboard screen changes, a display of the shortcut display region remains unchanged. That is, the client does not cancel the display of the shortcut display region due to the switching of the chessboard screen.

In an embodiment, the identifier of the target user account includes a nickname, an avatar, a sequence number in the chess game match of the target user account, and/or the like. In some embodiments, when the client receives a selection instruction for the identifier of the target user account, it indicates that the user wants to cause a display process of the chessboard screen of the target user account to be convenient and fast. An upper limit of the quantity of target user accounts is less than the total quantity of user accounts participating in the chess game match. For example, the total quantity of user accounts participating in a chess game match is 100, and the upper limit of the quantity of target user accounts is 4. The total quantity of user accounts participating in the chess game match may be any number such as, for example, 89, 90, 92, 95, 98, 102, or the like, and the upper limit of the quantity of target user accounts may further be 1, 2, 3, 5, 8, or the like. The total quantity of user accounts participating in the chess game match and the upper limit of the quantity of target user accounts may be set by related technical personnel according to actual conditions, which are not specifically limited in this embodiment of the disclosure.

In some embodiments, when the quantity of target user accounts is more than one, the operation for the identifier of the target user account among the identifiers of a plurality of user accounts refers to the operation of simultaneously selecting the identifiers of the plurality of target user accounts. That is, the user may select the identifiers of the plurality of target user accounts in batches. In some other embodiments, the operation for the identifier of the target user account among the identifiers of a plurality of user accounts refers to the operation of respectively selecting an identifier of each target user account. That is, the user performs the same selection operation on the identifier of the each target user account.

Figure 3:
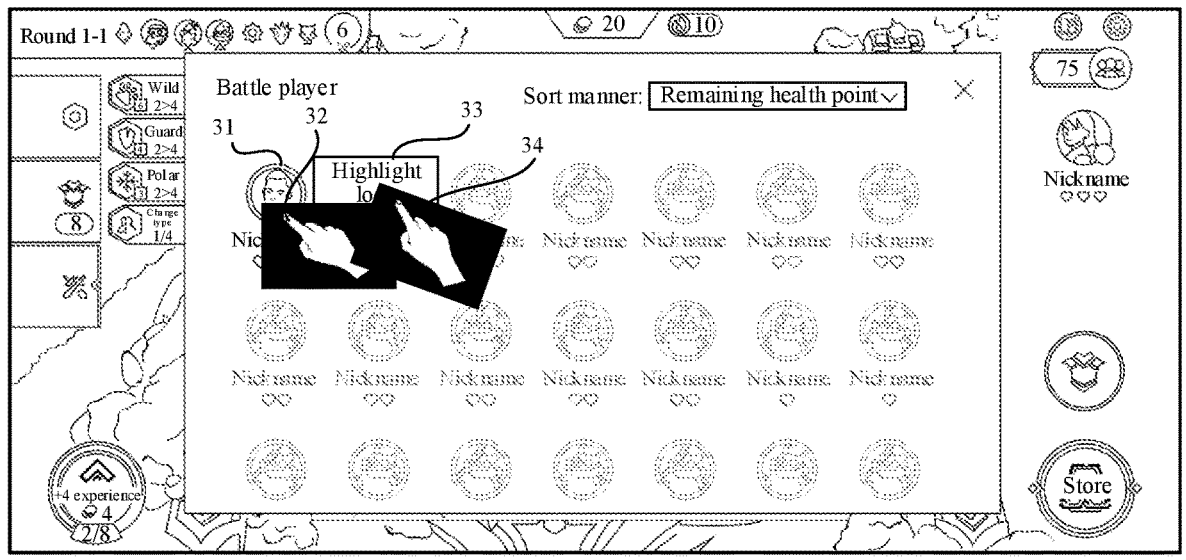
FIG. 3 is a schematic view illustrating a screen display method according to an embodiment of the disclosure.
Figure 3:
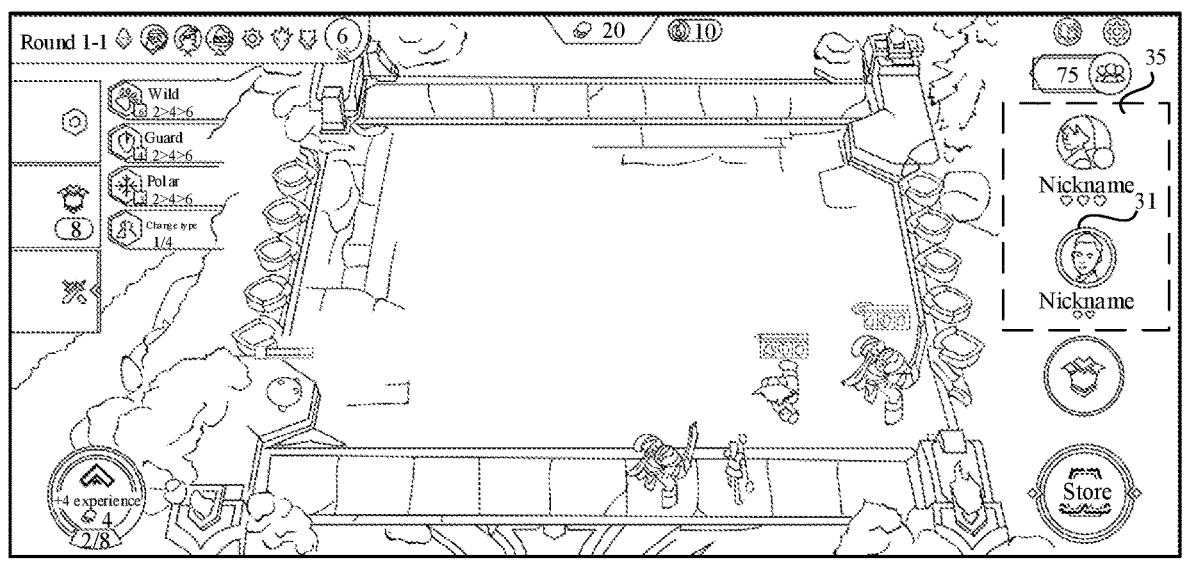
Figure 4:
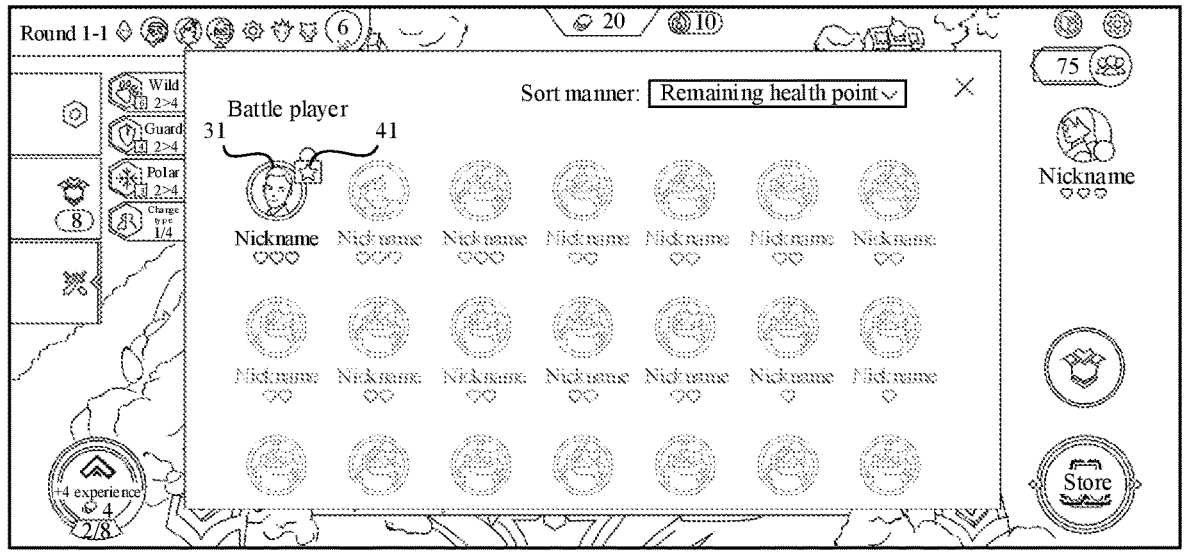
FIG. 4 is a schematic diagram of an interface of a screen display method according to an embodiment of the disclosure.

FIG. 3 is a schematic view illustrating a screen display method according to an embodiment of the disclosure, and FIG. 4 is a schematic diagram of an interface of a screen display method according to an embodiment of the disclosure. In some embodiments, as shown in FIG. 3, the operation 202 further includes the following operations:

1. A locking confirmation control 33 corresponding to the target user account is displayed in response to a pre-selection operation 32 for a target user account 31; and
2. The identifier of the target user account 31 is displayed in a shortcut display region 35 in response to a selection confirmation operation 34 for the locking confirmation control 33.

In an embodiment, an operation performed on an identifier of the target user account 31 among identifiers of the plurality of user accounts may include two operations: the pre-selection operation 32 on the identifier of the target user account 31 is first received, and the locking confirmation control 33 is displayed; and through the selection confirmation operation 34 on the locking confirmation control 33, the selection of the target user account 31 is confirmed, and the identifier of the target user account 31 is displayed in the shortcut display region 35, thereby reducing the probability of selection errors (for example, the identifier of the user account that does not need to be selected is fixedly displayed in the shortcut display region 35) that may be caused by misoperation.

In an embodiment, a locking confirmation control 33 is displayed near the identifier of the target user account 31.

In some embodiments, after the pre-selection operation 32 on the target user account 31, the identifier of the target user account 31 is highlighted, including but is not limited to at least one of the following:

(1) Identifiers other than the identifier of the target user account 31 are changed from color to gray;
(2) The transparency of other identifiers other than the identifier of the target user account 31 is improved, or the brightness of other identifiers other than the identifier of the target user account 31 is reduced;
(3) The identifier of the target user account 31 is highlighted; and
(4) As shown in FIG. 4, a display locking mark 41 is added to the identifier of the target user account 31.

In some embodiments, the shortcut display region is displayed on an upper layer of an edge region in an interface. An edge region of the interface may be a right edge region of the interface, a left edge region of the interface, an upper edge region of the interface, or a lower edge region of the interface, so as to reduce or avoid occlusion of the chessboard screen.

Operation 204. Display, in response to an operation on an identifier of a target user account in the display interface, a target chessboard screen of the target user account.

In some embodiments, the target chessboard screen is a chessboard screen of the target user account in the chess game match. In some embodiments, the client receives the operation on the identifier of the target user account in the shortcut display region, cancels the display of the first chessboard screen, and switches to display a chessboard screen of the target user account as the target chessboard screen. In an embodiment, in a process of switching to display the chessboard screen of the target user account as the target chessboard screen, a transition animation may be displayed for smoothly switching the chessboard screen.

The operation on the identifier of the target user account in the shortcut display region may be a touch operation (such as a click operation, a double-click operation, a triple-click operation, a long-press operation, a swiping operation, or the like) performed by a touch object (such as a mouse cursor, a touch pen, a finger, a knuckle, or the like) on the identifier of the target user account; and the operation on the identifier of the target user account in the shortcut display region may also be a voice control operation for the target user account.

In the technical solution provided in this embodiment of the disclosure, the target user account that is followed by the user is selected from a plurality of user accounts participating in the chess game match in advance, and the identifier of the target user account is fixedly displayed in the shortcut display region. When the user needs to view the chessboard screen of the target user account, the user only needs to directly trigger the identifier of the target user account in the shortcut display region, and the chessboard screen of the target user account may be directly displayed. Because identifiers of a preset number or less of user accounts are displayed in the shortcut display region, time consumed by the user to find the identifier of the target user account is saved; and for a specific user account (that is, a target user account), the corresponding chessboard screen may be displayed with only one operation, and operation steps are few. Therefore, the technical solution provided in this embodiment of the disclosure saves search time consumed by viewing the chessboard screen of the specific user account, and simplifies the operation steps, thereby improving the viewing efficiency of the chessboard screen of the specific user account.

Figure 5:
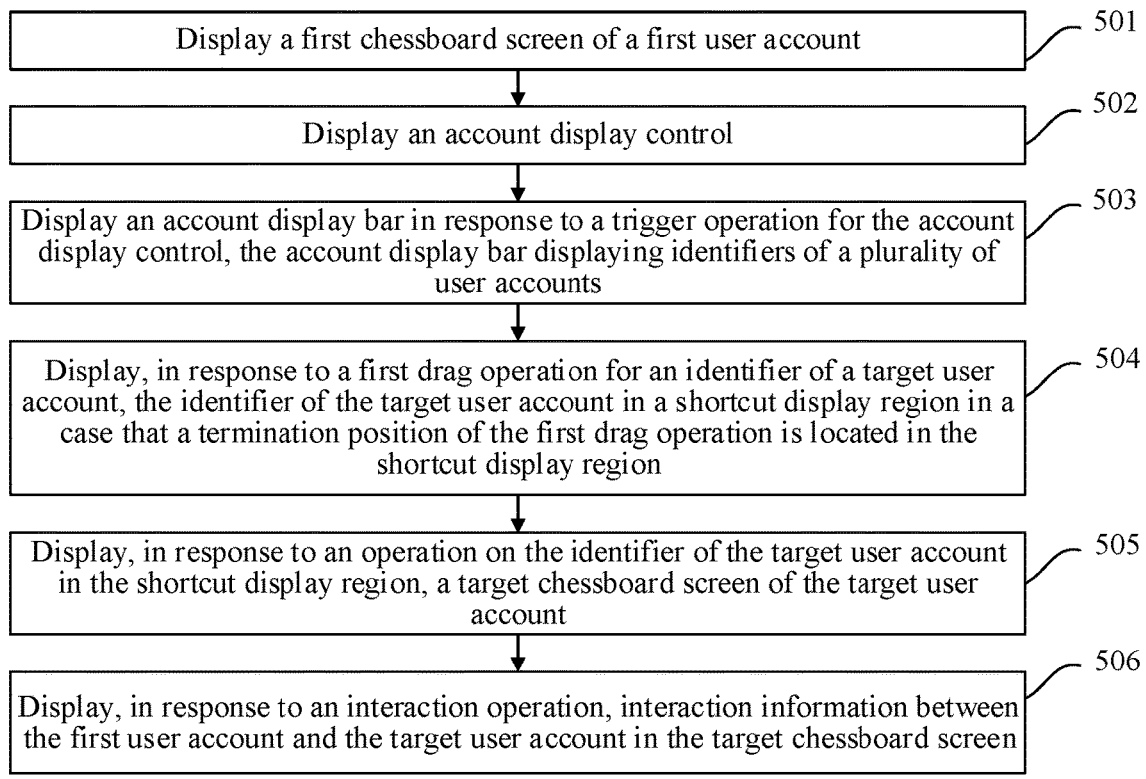
FIG. 5 is a flowchart illustrating a screen display method according to an embodiment of the disclosure.

FIG. 5 is a flowchart of a screen display method according to an embodiment of the disclosure. In this embodiment, descriptions are made by using an example in which the method is applied to the client described above. The method may include the following operations, 501 to 506:

Operation 501: Display a first chessboard screen of a first user account.

The content of operation 501 may be the same as or similar to that of operation 201 in the foregoing embodiment in FIG. 2, and details are not described herein again.

Operation 502. Display an account display control.

In some embodiments, the upper layer of the chessboard screen (such as the first chessboard screen) displays a control layer, and the control layer includes an account display control. Triggering the account display control may display identifiers of a plurality of user accounts. In an embodiment, the account display control displays the quantity of user accounts that have not been eliminated, and/or the account display control displays the quantity of all user accounts participating in the chess game match.

Operation 503. Display an account display bar in response to a trigger operation for the account display control, the account display bar displaying the identifiers of a plurality of user accounts.

Figure 6:
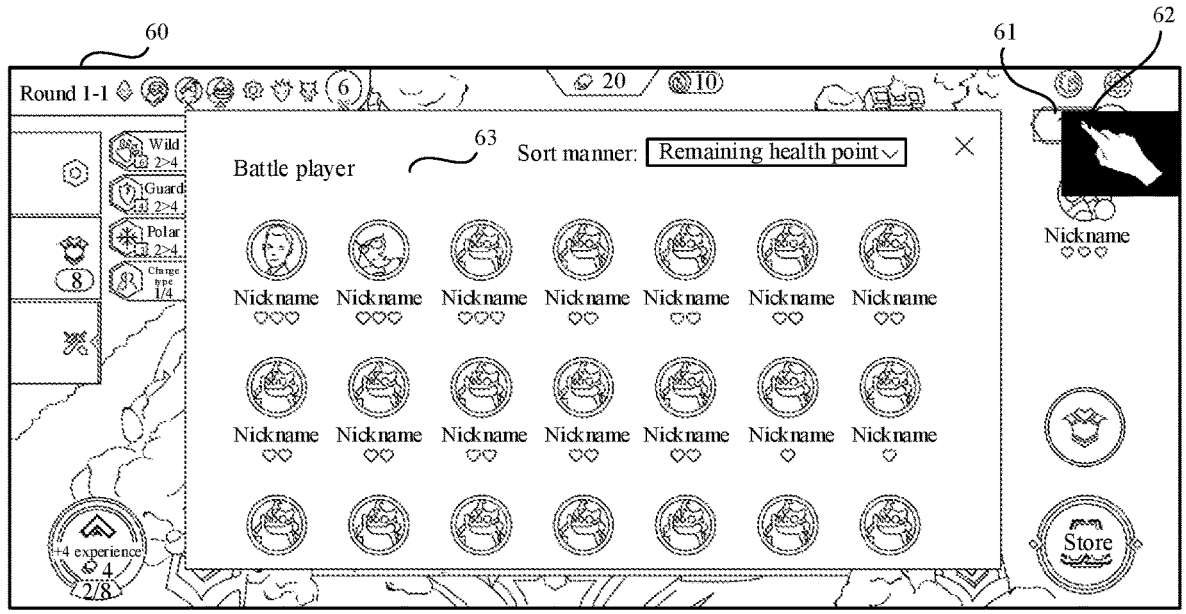
FIG. 6 is a schematic diagram of an interface in a screen display method according to an embodiment of the disclosure.

FIG. 6 is a schematic diagram of an interface in a screen display method according to an embodiment of the disclosure. In some embodiments, as shown in FIG. 6, an account display control 61 is displayed in the interface 60. When the client receives an account display operation 62 for the account display control 61, an account display bar 63 is displayed in the interface. The account display operation 62 may be a touch operation (such as a click operation, a double-click operation, a triple-click operation, a long-press operation, a swiping operation, or the like) performed by a touch object (such as a mouse cursor, a touch pen, a finger, a knuckle, or the like) for an account display control; and the account display operation 62 may also be a voice control operation for the account display control 61. In some embodiments, the account display bar is displayed on the upper layer of the first chessboard screen with a specific degree of transparency; and that is, the user may see a complete first chessboard screen through the account display bar, so that the user may understand a battle state of the chess game in which the first user account is located at any time.

In an embodiment, as shown in FIG. 6, identifiers of a plurality of user accounts participating in the chess game match are displayed in the account display bar, and a display region of the account display bar 63 is smaller than or equal to the interface 60. In some embodiments, the plurality of user accounts corresponding to the plurality of identifiers displayed in the account display bar are user accounts that still exist in the chess game match and are eligible to continue participating in the chess game match; and that is, the plurality of user accounts corresponding to the plurality of identifiers displayed in the account display bar are user accounts that still have not been eliminated.

Operation 504. Display, in response to an operation (e.g., selection such as a drag operation) for an identifier of a target user account, the identifier of the target user account in the shortcut display region.

Figure 7:
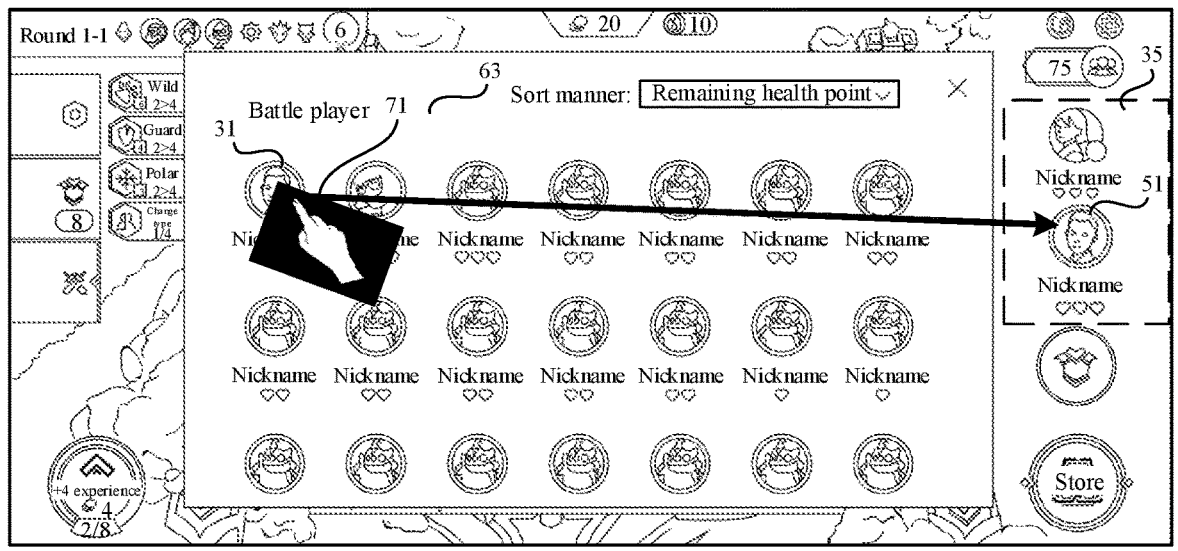
FIG. 7 is a schematic diagram of an interface in a screen display method according to an embodiment of the disclosure.

FIG. 7 is a schematic diagram of an interface in a screen display method according to an embodiment of the disclosure. As shown in FIG. 7, in an example embodiment, the screen display method may display, in response to a first drag operation 71 for the identifier of the target user account 31, the identifier of the target user account 31 in the shortcut display region 35 in a case that a termination position of the first drag operation 71 is located in the shortcut display region 35.

The first drag operation 71 is a drag operation from the account display bar 63 to the shortcut display region 35.

In some embodiments, the shortcut display region 35 is located outside the account display bar 63, and there is no overlapping region with the account display bar 63. In some other embodiments, a part of region of the shortcut display region overlaps with the account display bar.

In some embodiments, if a termination position of the first drag operation 71 is located in the shortcut display region 35, it indicates that the first drag operation 71 is a valid operation; and if a termination position of the first drag operation 71 is located outside the shortcut display region 35, it indicates that the first drag operation 71 is an invalid operation, thereby reducing the probability that the user misoperates. However, the above embodiments are merely given as an example and the disclosure is not limited thereto.

In some embodiments, the operation 504 further includes the following operations:
1. A display position of the identifier of the target user account in the shortcut display region is determined according to the termination position of the first drag operation; and
2. The identifier of the target user account is displayed according to the display position of the identifier of the target user account in the shortcut display region.

In some embodiments, as shown in FIG. 7, the user drags the identifier of the target user account 31 from the account display bar 63 to the shortcut display region 35, and displays the identifier of the target user account 31 in the shortcut display region 35 based on the termination position of the first drag operation 71. The identifier of the target user account 31 may be locked in the shortcut display region 35 in one operation, thereby simplifying operation steps required for the user to lock the identifier, reducing the operation duration, and improving the operation efficiency.

In some embodiments, the shortcut display region includes a plurality of candidate positions. A display position of the identifier of the target user account in the shortcut display region is determined according to the termination position of the first drag operation, and the following operations are included:
1. Distances between the plurality of candidate positions and the termination position of the first drag operation are respectively determined; and
2. Among the plurality of candidate positions, a candidate position closest to the termination position of the first drag operation is determined as the display position of the identifier of the target user account in the shortcut display region.

In some embodiments, the candidate position refers to a vacant position in the shortcut display region in which the identifier is not displayed. In some other embodiments, the candidate position may include a plurality of candidate positions in the shortcut display region that can be used for displaying the identifier, and an identifier may not be displayed or may already be displayed at one of the plurality of candidate positions. If the candidate position closest to the termination position of the first drag operation is a candidate position A, and an identifier is still not displayed at the candidate position A, the identifier of the target user account is directly displayed at the candidate position A. In a case that an identifier A is already displayed at the candidate position A, a display of the identifier A at the candidate position A may be canceled, and the identifier of the target user account may be displayed at the candidate position A. The identifier A, which is removed from the candidate A, is displayed at another candidate position closest to the candidate position A among other candidate positions; or the display of the identifier A is canceled in the shortcut display region. It should be noted that the termination position of the first drag operation does not have to be very precise, provided that the termination position is closer to a position that is desired to display than other display positions, the identifier of the target user account may be successfully displayed at the corresponding position, thereby improving the operation convenience and the operation efficiency.

In some other example embodiments, the identifier in the shortcut display region is displayed in an order of being dragged into the shortcut display region. In this way, the identifiers of the user accounts may be automatically sorted when displayed in the shortcut display region, and the operation convenience and the operation efficiency are further improved. In an embodiment, the candidate position refers to a vacant position in the shortcut display region in which the identifier is not displayed, and a priority order of each position in the shortcut display region is preset; and after the user drags the identifier of the target user account into the shortcut display region, the identifier of the target user account is displayed at the candidate position with the highest priority among the plurality of candidate positions. In an example embodiment, the shortcut display region is located at a right edge region of the interface, and the candidate position with the highest priority is the uppermost and/or rightmost position among the plurality of candidate positions; in an example embodiment, the shortcut display region is a left edge region of the interface, and the candidate position with the highest priority is the uppermost and/or leftmost position among the plurality of candidate positions; in an example embodiment, the shortcut display region is an upper edge region of the interface, and the candidate position with the highest priority is the uppermost or leftmost position among the plurality of candidate positions; and in an example embodiment, the shortcut display region is a lower edge region of the interface, and the candidate position with the highest priority is the lowermost or leftmost position among the plurality of candidate positions.

In some embodiments, after the identifier of the target user account is displayed in the shortcut display region, a display position of the identifier of the target user account in the shortcut display region may still be adjusted. For example, through a second drag operation, the identifier of the target user account already displayed in the shortcut display region is dragged to another position in the shortcut display region; and the updated display position of the identifier of the target user account is determined according to the termination position of the second drag operation, and the identifier of the target user account is redisplayed in the updated display position. After the identifier of the user account is displayed in the shortcut display region, a display position of the identifier of the user account may still be adjusted, thereby improving the display flexibility of the identifier of the user account in the shortcut display region.

For an example of a manner of determining the updated display position of the identifier of the target user account according to the termination position of the second drag operation, reference may be made to the above content for the description of determining the display position of the identifier of the target user account in the shortcut display region based on the termination position of the first drag operation, which is not repeated herein.

In some example embodiments, after the operation 503, a display of the identifier of the target user account is canceled in the shortcut display region in response to a deselection operation for the identifier of the target user account. The deselection operation may be a touch operation (such as a click operation, a double-click operation, a triple-click operation, a long-press operation, a swiping operation, or the like) performed by a touch object (such as a mouse cursor, a touch pen, a finger, a knuckle, or the like) for an identifier of a target user account on the identifier of the target user account; and the deselection operation may also be a voice control operation for the target user account. The deselection operation may be an operation for the identifier of the target user account in the shortcut display region, or may also be an operation for the identifier of the target user account in the account display bar.

In some other example embodiments, after the operation 504, in a case that the target user account is eliminated in the chess game match, the display of the identifier of the target user account is canceled in the shortcut display region, or a display state of the identifier of the target user account is changed. In an embodiment, changing the display state of the identifier of the target user account may refer to changing a color (such as changing from color to gray or black), brightness (such as reducing the brightness), and a size (such as a smaller display size) of the identifier of the target user account; and may refer to adding an elimination display mark (such as adding a text mark that indicates "elimination" and "out", or adding an icon to indicate elimination) in the identifier of the target user account, or near the identifier of the target user account.

Operation 505. Display, in response to an operation on an identifier of a target user account in the shortcut display region, a target chessboard screen of the target user account.

The content of operation 505 may be the same as or similar to that of operation 204 in the foregoing embodiment in FIG. 2, and details are not described herein again.

Operation 506. Display, in response to an interaction operation, interaction information between the first user account and the target user account in the target chessboard screen.

In some embodiments, a control layer is displayed on the upper layer of the chessboard screen in the chess game match, and the control layer is used for controlling a chess game state of the first user account. In an embodiment, the interaction information includes information that a user corresponding to the first user account prompts a user corresponding to the target user account to perform chess game layout for a chess game of the target user account. That is, the user corresponding to the target user account may adjust the chess game layout of the target user account according to the prompt of the user corresponding to the first user account.

In some embodiments, the target user account is an account that establishes a friend relationship with the first user account. That is, only a user account (such as user accounts that follow each other) that establishes a friend relationship may view the chessboard screen of each other's accounts, thereby improving the confidentiality of the battle state of the chess game the user is in.

In some example embodiments, the identifier of the first user account is also displayed in the interface (for example, displayed in the shortcut display region), and in response to a chess game viewing operation for the identifier of the first user account, the display of the chessboard screen of the first user account is returned to.

In some other example embodiments, the interface (such as a control layer in the interface) displays a chess game return control, and the chessboard screen displayed in the interface is switched to the chessboard screen of the first user account through a return operation for the chess game return control.

In some example embodiments, after the operation 505, the method further includes the following operations:
1. A chess game viewing request for the target user account is generated and transmitted, where the chess game viewing request carries the identifier of the target user account; and
2. The identifier of the target user account is displayed in the shortcut display region in a process of displaying the chessboard screen of the first user account in response to the operation on the identifier of the target user account and in response to that the chess game viewing request is confirmed.

In some embodiments, the chessboard screen of the first user account refers to the chessboard screen displayed by the client that the first user account logs in. The chessboard screen may refer to the first chessboard screen in which the first user account participates in the chess game, or may also refer to other chessboard screens in the chess game in which the first user account does not participate in the chess game match.

In some embodiments, a first user account is logged in the first client running in the first terminal device, and a target user account is logged in the second client running in the second terminal device. The first terminal device and the second terminal device respectively establish a communication connection (such as a network connection) with the server. In an embodiment, the first client generates a chess game viewing request for the target user account, and transmits the chess game viewing request to the server; the server forwards the chess game viewing request to the second client; the second client receives a confirmation instruction for the chess game viewing request, and indicates that the user corresponding to the target user account agrees to the chess game viewing request, and the second client generates request confirmation information for the chess game viewing request, and transmits the request confirmation information to the server; the server transmits a request confirmation instruction corresponding to the request confirmation information to the first client; and the first client displays the identifier of the target user account in the interface according to the request confirmation instruction. In an embodiment, the user corresponding to the first user account may view the target chessboard screen only after the user corresponding to the target user account agrees, thereby improving the confidentiality of the battle state of the chess game the user is in.

In the technical solution provided in this embodiment of the disclosure, through the operation of the first drag operation, the identifier of the target user account may be locked in the shortcut display region, thereby simplifying operation steps that the user needs to perform to lock an identifier of a specific user account, reducing the operation duration, and improving the operation efficiency.

In addition, the drag operation is further used for determining the display position of the identifier of the target user account in the shortcut display region, further improving the operation efficiency of locking the identifier by the user.

Figure 8:
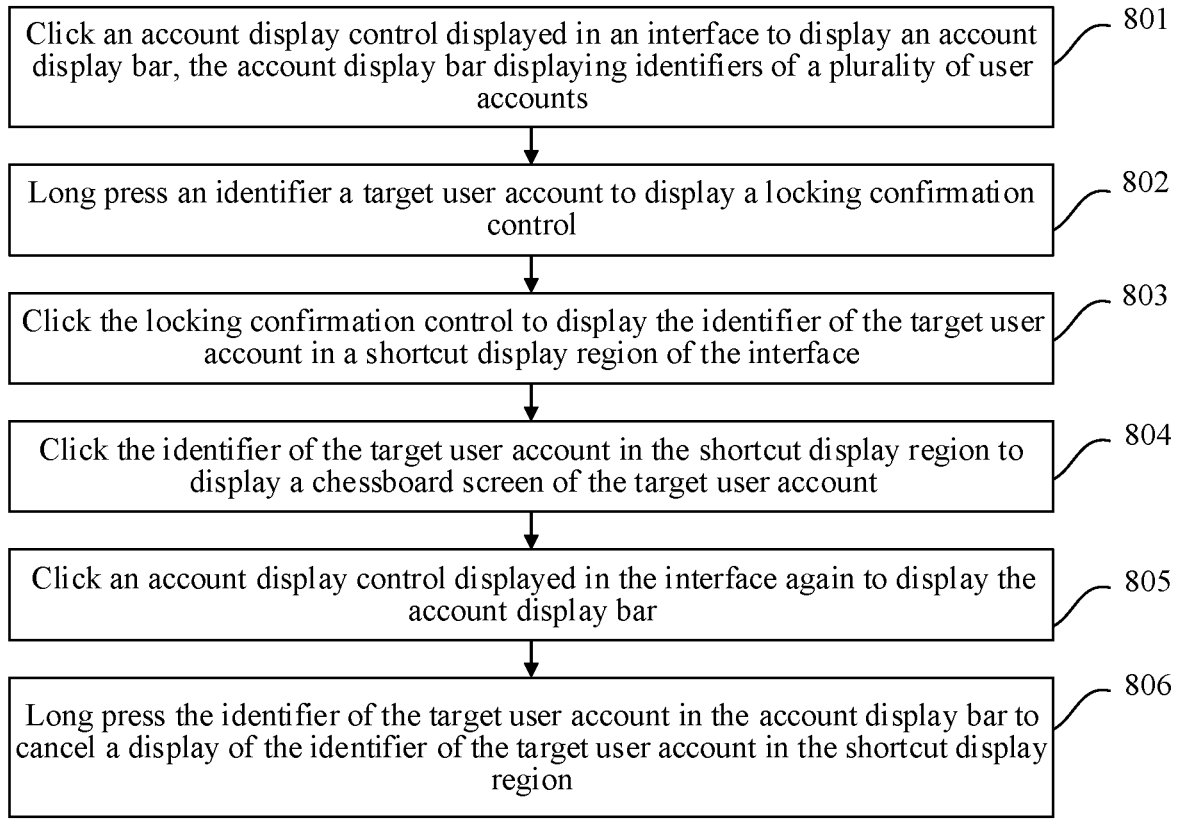
FIG. 8 is a flowchart of a screen display method according to an embodiment of the disclosure.

FIG. 8 is a flowchart of a screen display method according to an embodiment of the disclosure. As shown in FIG. 8, the method includes the following operations, 801 to 806:

Operation 801. Click an account display control displayed in an interface to display an account display bar, the account display bar displaying the identifiers of a plurality of user accounts;

Operation 802. Long press the identifier of the target user account to display a locking confirmation control;

Operation 803. Click the locking confirmation control to display the identifier of the target user account in the shortcut display region of the interface;

Operation 804. Click an identifier of a target user account in the shortcut display region to display a chessboard screen of the target user account;

Operation 805. Click an account display control displayed in an interface again to display an account display bar; and Operation 806. Long press the identifier of the target user account in the account display bar to cancel a display of the identifier of the target user account in the shortcut display region.

Figure 9:
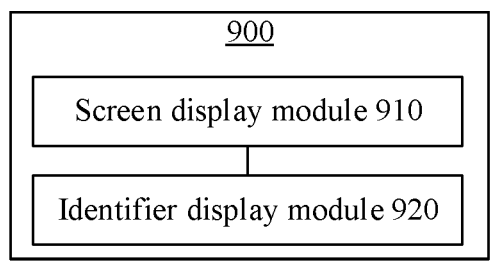
FIG. 9 is a block diagram of a screen display apparatus according to an embodiment of the disclosure.

FIG. 9 is a block diagram of a screen display apparatus according to an embodiment of the disclosure The apparatus has functions of implementing the foregoing chessboard screen display method embodiments. The functions may be implemented by hardware, or may be implemented by hardware executing corresponding software. The apparatus may be the terminal device described above, or may be disposed on the terminal device. An apparatus 900 may include a screen display module 910 and an identifier display module 930.

The screen display module 910 is configured to display a display interface of an application (e.g., a chess game match), the display interface displaying a screen (e.g., a first chessboard screen) of a first user account in an application. The first chessboard screen may be a chessboard screen of the first user account in the chess game match.

The identifier display module 920 is configured to display an account display bar, the account display bar displaying the identifiers of a plurality of user accounts, and the plurality of user accounts being user accounts participating in the chess game match.

The identifier display module 920 is further configured to display, in response to an operation on an identifier of a target user account among identifiers of the plurality of user accounts, the identifier of the target user account in the display interface.

The screen display module 910 is further configured to display a target chessboard screen of the target user account in response to the operation on the identifier of the target user account, the target chessboard screen being a chessboard screen of the target user account in the chess game match.

In the technical solution provided in this embodiment of the disclosure, the target user account that is followed by the user is selected from a plurality of user accounts participating in the chess game match in advance, and the identifier of the target user account is fixedly displayed in the shortcut display region. When the user needs to view the chessboard screen of the target user account, the user only needs to directly trigger the identifier of the target user account in the shortcut display region, and the chessboard screen of the target user account may be directly displayed. Because identifiers of only a few user account are displayed in the shortcut display region, time consumed by the user to find the identifier of the target user account is saved; and for a specific user account (that is, a target user account), the corresponding chessboard screen may be displayed with only one operation, and operation steps are few. Therefore, the technical solution provided in this embodiment of the disclosure saves search time consumed by viewing the chessboard screen of the specific user account, and simplifies the operation steps, thereby improving the viewing efficiency of the chessboard screen of the specific user account.

In an example embodiment, the identifier display module 920 is configured to:
  display a locking confirmation control corresponding to the target user account in response to a pre-selection operation for the target user account; and
  display the identifier of the target user account in the shortcut display region in response to a selection confirmation operation for the locking confirmation control.

In an example embodiment, the display interface further displays an account display control; and the identifier display module 920 is configured to display the account display bar in response to a trigger operation for the account display control.

In an example embodiment, the display interface includes a shortcut display region, and the identifier of the target user account is displayed in the shortcut display region.

Figure 10:
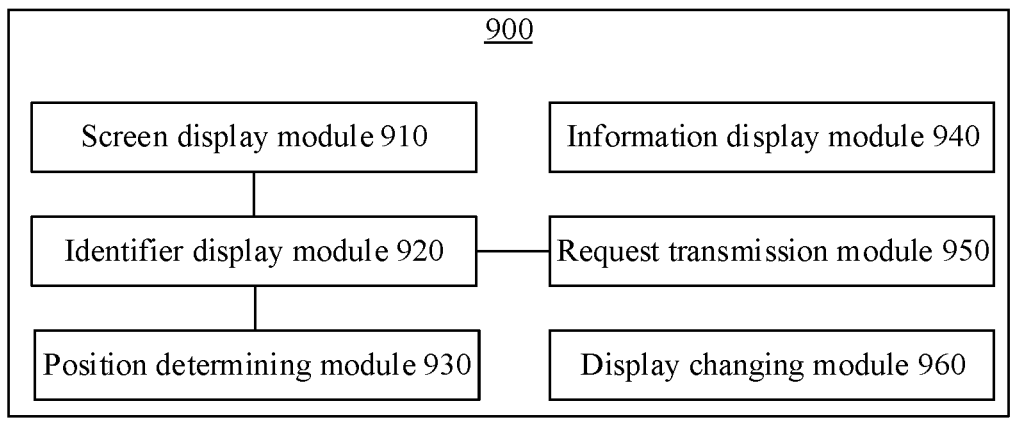
FIG. 10 is a block diagram of a screen display apparatus according to an embodiment of the disclosure.

FIG. 10 is a block diagram of a screen display apparatus according to an embodiment of the disclosure.

In an example embodiment, as shown in FIG. 10, the identifier display module 920 is further configured to display, in response to a first drag operation for the identifier of the target user account, the identifier of the target user account in the shortcut display region in a case that a termination position of the first drag operation is located in the shortcut display region.

In an example embodiment, as shown in FIG. 10, the apparatus 900 further includes: a position determining module 930.

The position determining module 930 is configured to determine a display position of the identifier of the target user account in the shortcut display region according to the termination position of the first drag operation.

The identifier display module 920 is further configured to display the identifier of the target user account according to the display position of the identifier of the target user account in the shortcut display region.

In an example embodiment, the shortcut display region includes a plurality of candidate positions; and as shown in FIG. 10, the position determining module 930 is configured to:

respectively determine distances between the plurality of candidate positions and the termination position of the first drag operation; and determine, among the plurality of candidate positions, a candidate position closest to the termination position of the first drag operation as the display position of the identifier of the target user account in the shortcut display region.

In an example embodiment, the identifier in the shortcut display region is displayed in an order of being dragged into the shortcut display region.

In an example embodiment, the shortcut display region is located on an upper layer of a chessboard screen in the chess game match.

In an example embodiment, a control layer is displayed on the upper layer of the chessboard screen in the chess game match, and the control layer is used for controlling a chess game state of the first user account; and as shown in FIG. 10, the apparatus 900 further includes: an information display module 940.

The information display module 940 is configured to display, in response to an interaction operation, interaction information between the first user account and the target user account in the target chessboard screen, where the interaction information is information that a user corresponding to the first user account prompts a user corresponding to the target user account to perform a chess game layout for a chess game of the target user account.

In an example embodiment, the first user account is an account that establishes a friend relationship with the target user account.

In an example embodiment, as shown in FIG. 10, the apparatus 900 further includes: a request transmission module 950.

The request transmission module 950 is configured to generate and transmit a chess game viewing request for the target user account, where the chess game viewing request carries the identifier of the target user account.

The identifier display module 920 is further configured to display the identifier of the target user account in the display interface in response to the operation on the identifier of the target user account and in response to that the chess game viewing request is confirmed.

In an example embodiment, as shown in FIG. 10, the apparatus 900 further includes: a display changing module 960.

The display changing module 960 is configured to cancel a display of the identifier of the target user account in the display interface in response to a deselection operation for the identifier of the target user account; or cancel a display of the target user account identifier in the display interface, or change a display state of the identifier of the target user account in response to the target user account being eliminated in the chess game match.

In an example embodiment, the identifier display module 920 is further configured to display the identifier of the target user account at an updated display position of the identifier of the target user account in response to a second drag operation for the identifier of the target user account, where the updated display position is determined according to a termination position of the second drag operation.

Figure 11:
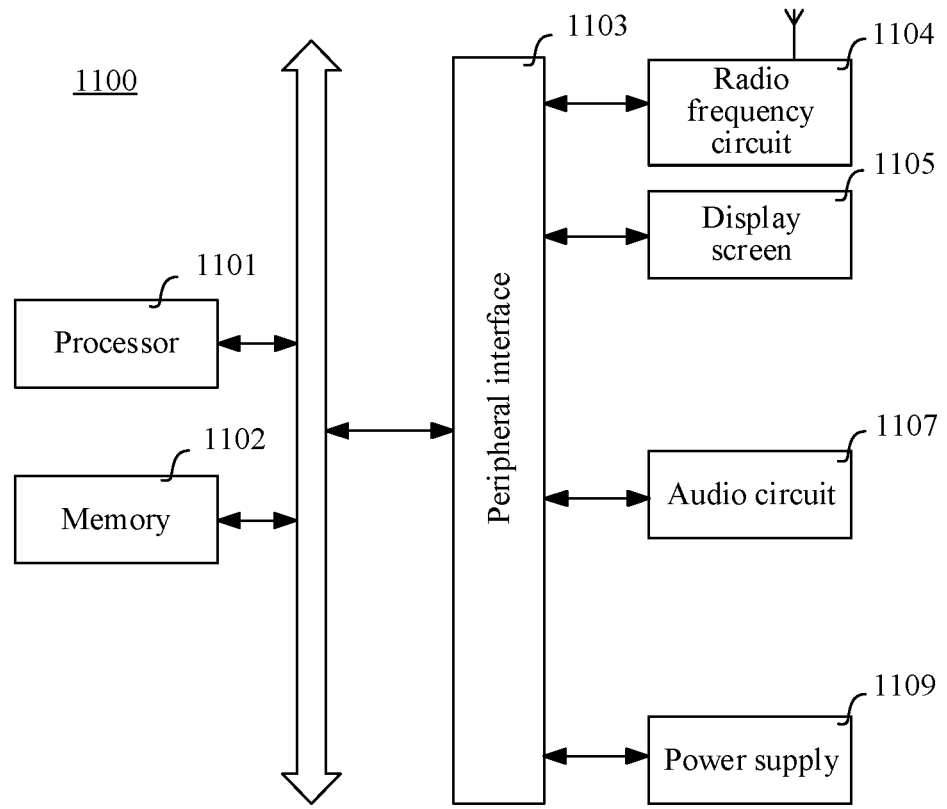
FIG. 11 is a block diagram of a terminal according to an embodiment of the disclosure.

FIG. 11 is a structural block diagram of a terminal device 1100 according to an embodiment of the disclosure. The terminal device 1100 may be a portable electronic device, such as a mobile phone, a tablet computer, a game console, an ebook reader, a multimedia playback device, a wearable device and PC. The terminal device is configured to implement the chessboard screen display method provided in the foregoing embodiments. The terminal device may be a terminal device 11 in the implementation environment shown in FIG. 1. Specifically:

generally, the terminal device 1100 includes a processor 1101 and a memory 1102.

The processor 1101 may include one or more processing cores, for example, a 4-core processor or an 8-core processor. The processor 1101 may be implemented by using at least one hardware form of a digital signal processor (DSP), a field programmable gate array (FPGA), and a programmable logic array (PLA). The processor 1101 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1101 may be integrated with a graphics processing unit (GPU). The GPU is configured to render and draw content that needs to be displayed on a display. In some embodiments, the processor 1101 may further include an artificial intelligence (AI) processor. The AI processor is configured to process computing operations related to machine learning.

The memory 1102 may include one or more computer-readable storage media that may be non-transitory. The memory 1102 may further include a high-speed random access memory and a non-volatile memory, such as one or more magnetic disk storage devices or flash storage devices. In some embodiments, the non-transient computer-readable storage medium in the memory 1102 is configured to store at least one instruction, at least one program, a code set, or an instruction set, and is configured to be executed by one or more processors, to implement the chessboard screen display method.

In some embodiments, the terminal device 1100 may optionally include a peripheral interface 1103 and at least one peripheral. The processor 1101, the memory 1102, and the peripheral interface 1103 may be connected by using a bus or a signal cable. Each peripheral may be connected to the peripheral interface 1103 through a bus, a signal cable, or a circuit board. Specifically, the peripheral includes: at least one of a radio frequency (RF) circuit 1104, a display screen 1105, an audio circuit 1107, and a power supply 1109.

A person skilled in the art would understand that the structure shown in FIG. 11 does not constitute a limitation on the terminal device 1100 and that the terminal device may include more or fewer assemblies than those shown in the figure, a combination of some assemblies, or different assembly arrangements.

In an example embodiment, a computer-readable storage medium is further provided, the storage medium storing at least one instruction, at least one program, a code set, or an instruction set, the at least one instruction, the at least one program, the code set, or the instruction set, when executed by the processor, implementing the chessboard screen display method.

In an embodiment, In an embodiment, the computer-readable storage medium may include: a read-only memory (ROM), a random-access memory (RAM), a solid state drive (SSD), an optical disc, or the like. The RAM may include a resistance random access memory (ReRAM) and a dynamic random access memory (DRAM).

In an example embodiment, a computer program product is provided, the computer program product including computer instructions, the computer instructions being stored in a computer-readable storage medium. A processor of a terminal device reads the computer instructions from the computer-readable storage medium, and executes the computer instructions, to cause the terminal device to perform chessboard screen display method.

Herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, routines, segments of program code, drivers, firmware, microcode, circuitry, data, databases, data structures, tables, arrays, and variables. A "module" may be divided into a plurality of "modules" that perform detailed functions.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A screen display method, performed by a terminal device, the method comprising:
    displaying a display interface of an application running on the terminal device, the display interface displaying a first application screen of a first user account in the application;
    displaying an account display bar, the account display bar displaying identifiers of a plurality of user accounts participating in a service related to the application;
    displaying, in response to an operation on an identifier of a target user account among the identifiers of the plurality of user accounts, the identifier of the target user account in the display interface;
    displaying a target screen of the target user account in response to the operation on the identifier of the target user account, the target screen being a screen of the target user account in the application;
    displaying, in response to an interaction operation, interaction information between the first user account and the target user account in the target screen, wherein
    the interaction information includes information prompted by a user corresponding to the first user account to a user corresponding to the target user account regarding a change of a layout of the screen of the target user account in the application.

2. The screen display method according to claim 1, wherein the displaying the identifier of the target user account in the display interface comprises:
    displaying a locking confirmation control corresponding to the target user account in response to a pre-selection operation for the target user account; and
    displaying the identifier of the target user account in the display interface in response to a selection confirmation operation for the locking confirmation control.

3. The screen display method according to claim 1, wherein the display interface further displays an account display control; and
    the displaying the account display bar comprises:
    displaying the account display bar in response to a trigger operation for the account display control.

4. The screen display method according to claim 1, wherein the display interface comprises a shortcut display region, and the identifier of the target user account is displayed in the shortcut display region.

5. The screen display method according to claim 4, wherein the displaying the identifier of the target user account in the display interface comprises:
    displaying, in response to a first drag operation for the identifier of the target user account, the identifier of the target user account in the shortcut display region based on a termination position of the first drag operation being located in the shortcut display region.

6. The screen display method according to claim 5, further comprising:
   determining a display position of the identifier of the target user account in the shortcut display region according to the termination position of the first drag operation; and
   displaying the identifier of the target user account according to the display position of the identifier of the target user account in the shortcut display region.

7. The screen display method according to claim 6, wherein the shortcut display region comprises a plurality of candidate positions; and
   the determining the display position of the identifier of the target user account comprises:
   respectively determining distances between the plurality of candidate positions and the termination position of the first drag operation; and
   determining, among the plurality of candidate positions, a candidate position closest to the termination position of the first drag operation as the display position of the identifier of the target user account in the shortcut display region.

8. The screen display method according to claim 5, wherein the identifier in the shortcut display region is displayed in an order of being dragged into the shortcut display region.

9. The screen display method according to claim 4, wherein the shortcut display region is located on an upper layer of a screen in the application.

10. The screen display method according to claim 1, wherein a control layer is displayed on an upper layer of a screen in the application, and the control layer is used for controlling an application state of the first user account.

11. The screen display method according to claim 1, wherein the first user account has a friend relationship with the target user account.

12. The screen display method according to claim 1, wherein after the displaying the account display bar, the method further comprises:
   generating and transmitting an application viewing request for the target user account, wherein the application viewing request includes the identifier of the target user account; and
   the displaying the identifier of the target user account in the display interface comprises:
   displaying the identifier of the target user account in the display interface in response to the operation on the identifier of the target user account and in response to that the application viewing request is confirmed.

13. The screen display method according to claim 1, wherein after the displaying the target screen of the target user account, the method further comprises:
   canceling a display of the identifier of the target user account in the display interface in response to a deselection operation for the identifier of the target user account;
   or
   in response to the target user account being eliminated in the application, canceling the display of the identifier of the target user account in the display interface, or changing a display state of the identifier of the target user account.

14. The screen display method according to claim 1, wherein after the displaying the identifier of the target user account in the display interface, the method further comprises:
   displaying the identifier of the target user account at an updated display position of the identifier of the target user account in response to a second drag operation for the identifier of the target user account, wherein
   the updated display position is determined according to a termination position of the second drag operation.

15. A screen display apparatus, comprising:
   at least one memory configured to store program code; and
   at least one processor configured to read the program code and operate as instructed by the program code, the program code including:
   screen display code configured to cause the at least one processor to display a display interface of an application, the display interface displaying a first screen of a first user account, and the first screen being a screen of the first user account in the application;
   identifier display code configured to cause the at least one processor to display an account display bar, the account display bar displaying the identifiers of a plurality of user accounts, and the plurality of user accounts being user accounts participating in a service related to the application;
   the identifier display code being further configured to cause the at least one processor to display, in response to an operation on an identifier of a target user account among the identifiers of the plurality of user accounts, the identifier of the target user account in the display interface;
   the screen display code being further configured to cause the at least one processor to display a target screen of the target user account in response to the operation on the identifier of the target user account, the target screen being a screen of the target user account in the application,
   information display code configured to cause the at least one processor to display, in response to an interaction operation, interaction information between the first user account and the target user account in the target screen, wherein
   the interaction information includes information prompted by a user corresponding to the first user account to a user corresponding to the target user account regarding a change of a layout of the screen of the target user account in the application.

16. The screen display apparatus according to claim 15, wherein the identifier display code is further configured to cause the at least one processor to:
   display a locking confirmation control corresponding to the target user account in response to a pre-selection operation for the target user account; and
   display the identifier of the target user account in the display interface in response to a selection confirmation operation for the locking confirmation control.

17. The screen display apparatus according to claim 15, wherein the display interface further displays an account display control; and the identifier display code is further configured to cause the at least one processor to display the account display bar in response to a trigger operation for the account display control.

18. The screen display apparatus according to claim 15, wherein the display interface comprises a shortcut display region, and the identifier of the target user account is displayed in the shortcut display region.

19. The screen display apparatus according to claim 18, wherein the identifier display code is further configured to cause the at least one processor to display, in response to a first drag operation for the identifier of the target user account, the identifier of the target user account in the shortcut display region based on a termination position of the first drag operation being located in the shortcut display region.

20. A non-transitory computer-readable storage medium, comprising a program stored therein, the program being executable by at least one processor to perform:
- displaying a display interface of an application running on a terminal device, the display interface displaying a first application screen of a first user account in the application;
- displaying an account display bar, the account display bar displaying identifiers of a plurality of user accounts participating in a service related to the application;
- displaying, in response to an operation on an identifier of a target user account among the identifiers of the plurality of user accounts, the identifier of the target user account in the display interface;
- displaying a target screen of the target user account in response to the operation on the identifier of the target user account, the target screen being a screen of the target user account in the application; and
- displaying, in response to an interaction operation, interaction information between the first user account and the target user account in the target screen, wherein
- the interaction information includes information prompted by a user corresponding to the first user account to a user corresponding to the target user account regarding a change of a layout of the screen of the target user account in the application.

* * * * *